United States Patent Office.

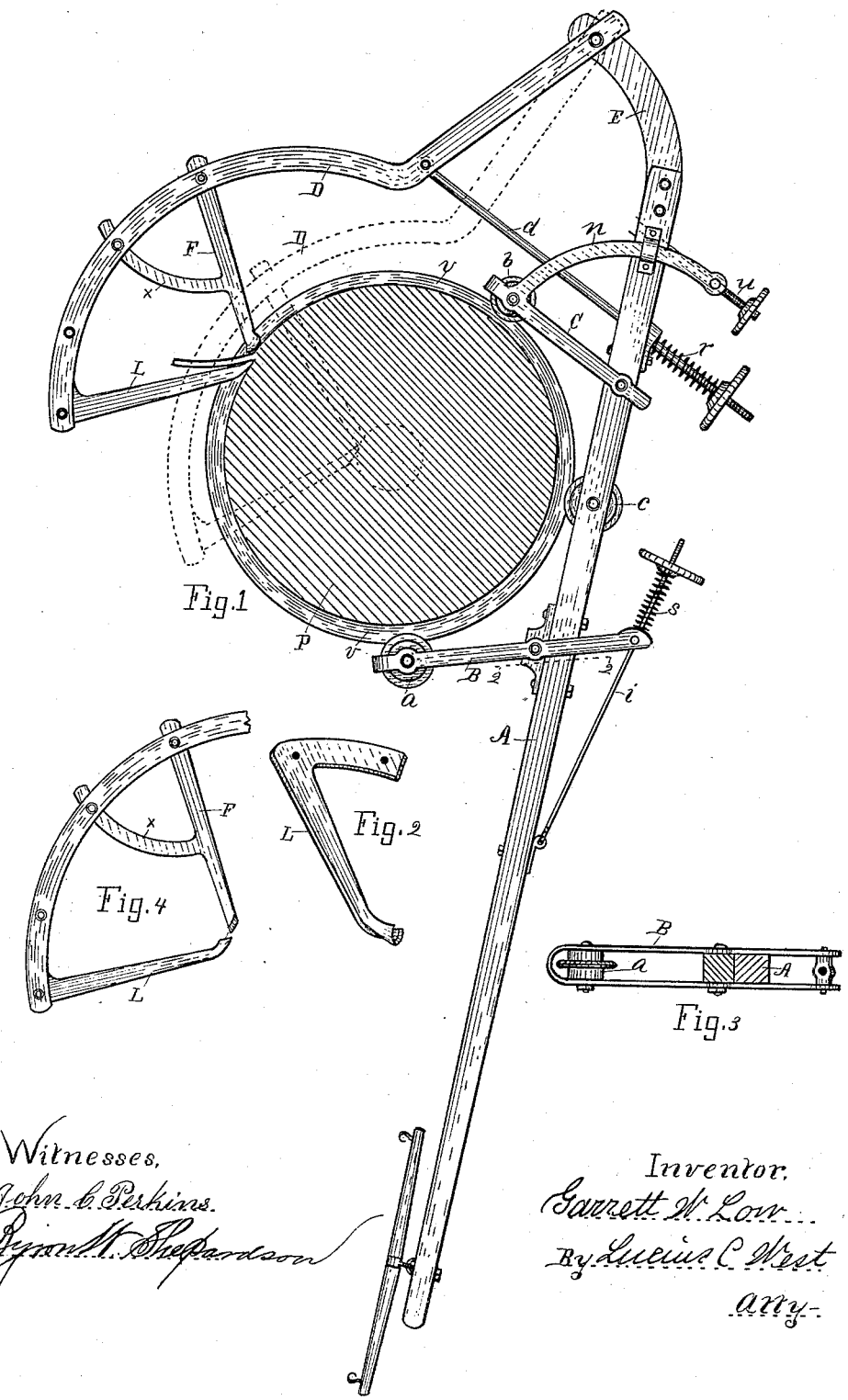

GARRETT W. LOW, OF KALAMAZOO, MICHIGAN, ASSIGNOR TO BYRON W. SHEPARDSON, OF SAME PLACE.

TREE-FELLER.

SPECIFICATION forming part of Letters Patent No. 396,825, dated January 29, 1889.

Application filed July 19, 1887. Renewed August 3, 1888. Serial No. 281,873. (No model.)

*To all whom it may concern:*

Be it known that I, GARRETT W. LOW, a citizen of the United States, residing at Kalamazoo, county of Kalamazoo, State of Michigan, have invented a new and useful Tree-Feller, of which the following is a specification.

This invention has for its object the construction of a machine for felling trees, substantially as below described and claimed.

In the drawings forming a part of this specification, Figure 1 is a plan view of the machine with the tree in cross-section; Fig. 2, a perspective view of a lettered detail in Fig. 1; Fig. 3, a section on line 2 2 in Fig. 1; and Fig. 4 shows lettered details from Fig. 1, showing a change below described.

Referring to the lettered parts of the drawings, A is a lever, to which a horse or other power may be applied to sweep the same around the tree P.

An arm, D, is pivotally attached to the end E of the lever A, and to the other end of said arm is rigidly attached the cutting-tool L. This tool is preferably like a gage at the cutting end, Fig. 2, but may be of any shape which will cause it to cut and remove from the tree a shaving, thus forming a groove into and around the tree P, Fig. 1.

At F is shown a gage attached to the arm D just forward of the cutter L to control the depth of cut. In Fig. 1 the end of the gage next to the tree is blunt and does not extend quite so far in as the cutter L. In Fig. 4 the end of the gage F is sharp and cuts a line forward of the cutting-tool L, and the sharp ends of both are on about the same plane. Either style of gage is operative; but that in Fig. 4 is deemed preferable, for the reason that it assists in holding up the machine, especially when starting, and it allows the shaving to yield from the cutting-tool more readily.

X is a brace to the gage F.

At *d* is shown a brace passed through the lever A and attached to the arm D at one end. The other end extends through and beyond the lever, and is provided with a spring, *r*, held and governed by a hand-wheel. By this means the cutting-tool operates under a spring resistance and automatically conforms to irregularities in the shape of the tree, and is also caused to follow deeper into the tree as the grooving process continues.

The dotted position of the arm D, Fig. 1, and the cutting-tool is designed to show the operation concluded, at which time the machine is removed to another tree and the central portion yet uncut is severed by hand with a saw. This is to guard against the falling tree breaking the machine. However, the machine can be adjusted to entirely sever the tree, if desired.

The lever A is provided with adjustable guides C *n* and B, the latter of which yields against the resistance of the spring S on the rod *i*. These guides are pivoted to the lever A, and the position of the guide C *n* may be changed by hand-screw *u*, if desired. These guides assist in holding up the machine. The ends which engage the tree may be sharpened, or they may be provided with the wheels *a b*, said wheels being sharp, or at least thin, at the edge, so as to enter the bark when the operation commences and to follow the groove during the operation. A less number of guides or a greater number may be employed, as the need demands. Both of the springs S and *r* may be made stiffer or weaker by turning the hand-wheels which retain them in place.

A wheel, *c*, may be employed to follow the groove, but not necessarily. The lever A and arm D may be termed a "frame," which bears the cutting-tool and guides.

Having thus described my invention, what I claim is—

1. The combination of a lever, a spring-actuated arm pivoted thereto and arranged to project on the opposite side of a tree, said arm being provided with a cutting-tool and a gage to control the depth of cut, and the lever being provided with guides adapted to follow the groove during the operation of cutting, and thus support the machine, substantially as set forth.

2. A lever having a pivoted spring-actuated arm arranged to project on the opposite side of the tree, said arm being provided with a cutting-tool and gage, substantially as set forth.

3. The combination of a frame bearing a cutting-tool, an adjustable guide, and a guide adapted to yield against a spring resistance, substantially as set forth.

4. A frame partially or entirely encompassing the tree, having suitable guides to hold it in place, and provided with a cutting-tool and a gage preceding said tool having a sharpened end, substantially as set forth.

In testimony of the foregoing I have hereunto subscribed my name in presence of two witnesses.

GARRETT W. LOW.

Witnesses:
BYRON W. SHEPARDSON,
L. L. BALLOU.